(12) United States Patent
Petricoin, Jr.

(10) Patent No.: US 8,412,789 B2
(45) Date of Patent: Apr. 2, 2013

(54) SYSTEM AND METHOD FOR CONNECTING A SECURITY SYSTEM USING A NETWORK

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 808 days.

(21) Appl. No.: 12/200,579

(22) Filed: Aug. 28, 2008

(65) Prior Publication Data

US 2010/0057943 A1 Mar. 4, 2010

(51) Int. Cl.
*G06F 15/16* (2006.01)

(52) U.S. Cl. .......................................... 709/208; 710/10

(58) Field of Classification Search .................. 709/208
See application file for complete search history.

(56) References Cited

U.S. PATENT DOCUMENTS

| | | | |
|---|---|---|---|
| 6,522,664 | B1 | 2/2003 | Kawahara |
| 6,553,336 | B1 * | 4/2003 | Johnson et al. ............... 702/188 |
| 6,978,194 | B2 | 12/2005 | McIlhany et al. |
| 7,110,919 | B2 | 9/2006 | Brindac et al. |
| 7,353,070 | B2 | 4/2008 | Landou et al. |
| 2004/0153701 | A1 * | 8/2004 | Pickell ............................... 714/4 |
| 2004/0176877 | A1 | 9/2004 | Hesse et al. |
| 2004/0218591 | A1 | 11/2004 | Ogawa et al. |
| 2005/0143863 | A1 | 6/2005 | Ruane et al. |
| 2005/0226201 | A1 * | 10/2005 | McMillin ....................... 370/348 |
| 2005/0288823 | A1 | 12/2005 | Hesse et al. |
| 2006/0095146 | A1 | 5/2006 | Hesse et al. |
| 2006/0190138 | A1 | 8/2006 | Stone et al. |

(Continued)

FOREIGN PATENT DOCUMENTS

| | | |
|---|---|---|
| EP | 1259033 | 11/2002 |
| EP | 1294132 | 3/2003 |

(Continued)

OTHER PUBLICATIONS

Bender, J., Newman, M. of Cornell University, "Introduction to BACNet", BACnet/IP, Available Online at: <http://www.bacnet.org/Tutorial/BACnetIP/default.html>, pp. 1-37, Dated May 8, 2008.
PCT/US2009/055172 International Search Report and Written Opinion dated May 28, 2010 (19 pages).

*Primary Examiner* — Hussein Elchanti
*Assistant Examiner* — Maceeh Anwari
(74) *Attorney, Agent, or Firm* — Michael Best & Friedrich LLP

(57) ABSTRACT

A system and method for connecting a security system using a network. The security system includes at least two discrete parts and is connected using a local area network. The security system also includes a first dedicated, hard-wired field bus, a first plurality of peripheral devices, a control panel, a first transfer device, a second transfer device, a second dedicated, hard-wired field bus, and a second plurality of peripheral devices. The control panel is configured to send data through the first field bus. Each of the first plurality of peripheral devices is coupled to the first field bus and is configured to receive the data from the control panel. The first transfer device is connected to the control panel and is configured to packetize the data from the control panel and send the packetized data through the local area network. The second transfer device is coupled to the second field bus and is configured to receive the packetized data from the first transfer device and depacketize the packetized data. Each of the second plurality of peripheral devices is coupled to the second field bus and is configured to receive the data from the second transfer device.

18 Claims, 9 Drawing Sheets

U.S. PATENT DOCUMENTS

| | | |
|---|---|---|
| 2006/0224252 A1 | 10/2006 | Brindac et al. |
| 2007/0043476 A1 | 2/2007 | Richards et al. |
| 2007/0055756 A1 | 3/2007 | Richards et al. |
| 2007/0055758 A1 | 3/2007 | McCoy et al. |
| 2007/0055759 A1 | 3/2007 | McCoy et al. |
| 2007/0055760 A1 | 3/2007 | McCoy et al. |

FOREIGN PATENT DOCUMENTS

| | | |
|---|---|---|
| EP | 1521401 | 4/2005 |
| WO | 03/079192 | 9/2003 |

* cited by examiner

SYSTEM AND METHOD FOR CONNECTING A SECURITY SYSTEM USING A NETWORK

BACKGROUND

The present invention relates to connecting discrete parts of a hard-wired security system using a network. Traditional security systems, such as those used in many commercial or industrial facilities, often use dedicated, hard-wired field busses to interconnect each of the devices in the security system. The field busses connect devices, such as user interfaces, input/output (I/O) devices, alarms, and the like to a security or control panel. However, the installation of dedicated, hard-wired field busses for connecting each component or device within a security system is often time consuming and expensive. For example, FIG. 1 illustrates a security system 10 that uses a single dedicated, hard-wired bus 15 to connect each device in the security system 10. The security system 10 includes a control panel 20, an I/O device 25, and a user interface 30. Installing the security system 10 requires installing dedicated, hard-wired field busses between each of the devices or discrete parts of the security system. For example, dedicated, hard-wired field busses are required to connect the control panel on, for example, a building's first floor, the I/O device on the building's third floor, and the user interface on the building's fifth floor.

Alternatively, some security systems require replacing or converting each device in the security system such that each device is able to connect to a network, such as an IP-based network. However, like installing hard-wired field busses throughout the entire security system, converting or replacing each device such that they can connect to a network can be cost prohibitive and may render other existing, non-networked devices incompatible with the network-based parts of the security system.

SUMMARY

In light of the above-noted disadvantages of traditional security systems that use dedicated, hard-wired field busses or an entirely network based system, there is a need for an easy to install, versatile, and less expensive system and method for connecting discrete components and parts of a security system.

In one embodiment, the invention provides a system that utilizes an existing network to connect discrete parts of a security system. The system includes a control panel, a first transfer device, a second transfer device, and a peripheral device. Each device includes a device address for identification in the security system. The first transfer device is connected to the control panel. The control panel is configured to send information to a peripheral device that is in a discrete part of the security system or building. The first transfer device receives information that is to be sent to the peripheral device and converts the information from a first form to a second form in order for the information to be sent through the network. A second transfer device is configured to receive the converted information from the first transfer device. The second transfer device converts the converted information back from the second form to the first form. If the information includes a destination address that is different than the device address of the second transfer device, the second transfer device sends the information out on a second field bus to the peripheral device.

In another embodiment, the invention provides a security system with at least two discrete parts that are connected using a local area network. The security system also includes a first dedicated, hard-wired field bus, a first plurality of peripheral devices, a control panel, a first transfer device, a second transfer device, a second dedicated, hard-wired field bus, and a second plurality of peripheral devices. The control panel is configured to send data through the first field bus. Each of the first plurality of peripheral devices is coupled to the first field bus and is configured to receive the data from the control panel. The first transfer device is connected to the control panel and is configured to packetize the data from the control panel and send the packetized data through the local area network. The second transfer device is coupled to the second field bus and is configured to receive and depacketize the packetized data from the first transfer device. Each of the second plurality of peripheral devices is coupled to the second field bus and is configured to receive the data from the second transfer device.

In yet another embodiment, the invention provides a method for connecting discrete parts of a security system using a local area network. The method includes configuring a control panel to send data through a first dedicated, hard-wired field bus, coupling a first plurality of peripheral devices to the first field bus, and configuring each of the first plurality of peripheral devices to receive the data from the control panel. A first transfer device is connected to the control panel and is configured to convert the data from a first form to a second form. The method also includes sending the converted data through the local area network, coupling a second transfer device to a second dedicated, hard-wired field bus, and configuring the second transfer device to receive the converted data from the first transfer device. The second transfer device converts the converted data from the second form to the first form. A second plurality of peripheral devices is coupled to the second field bus and each of the second plurality of peripheral devices is configured to receive the data from the second transfer device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
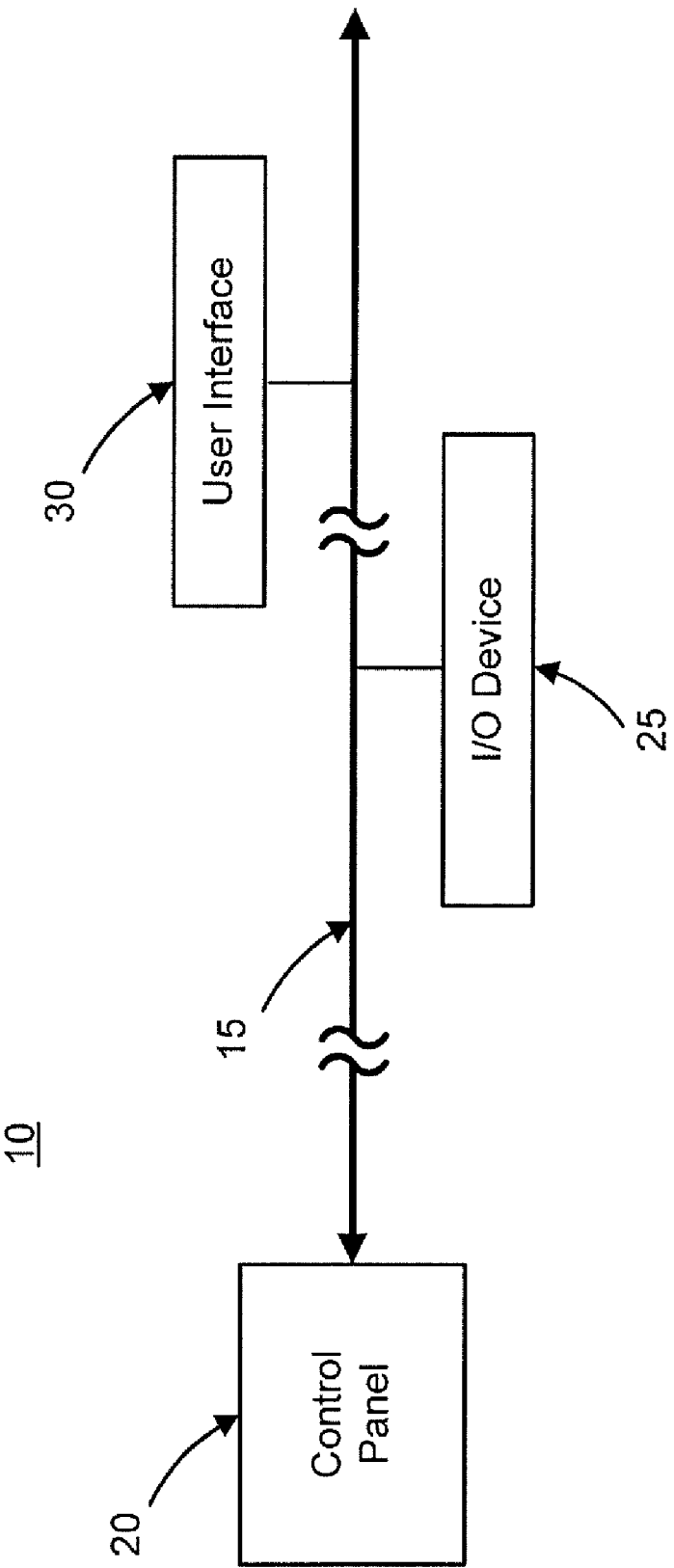
FIG. 1 is a diagram of a security system using only a dedicated, hard-wired field bus.
Figure 2:
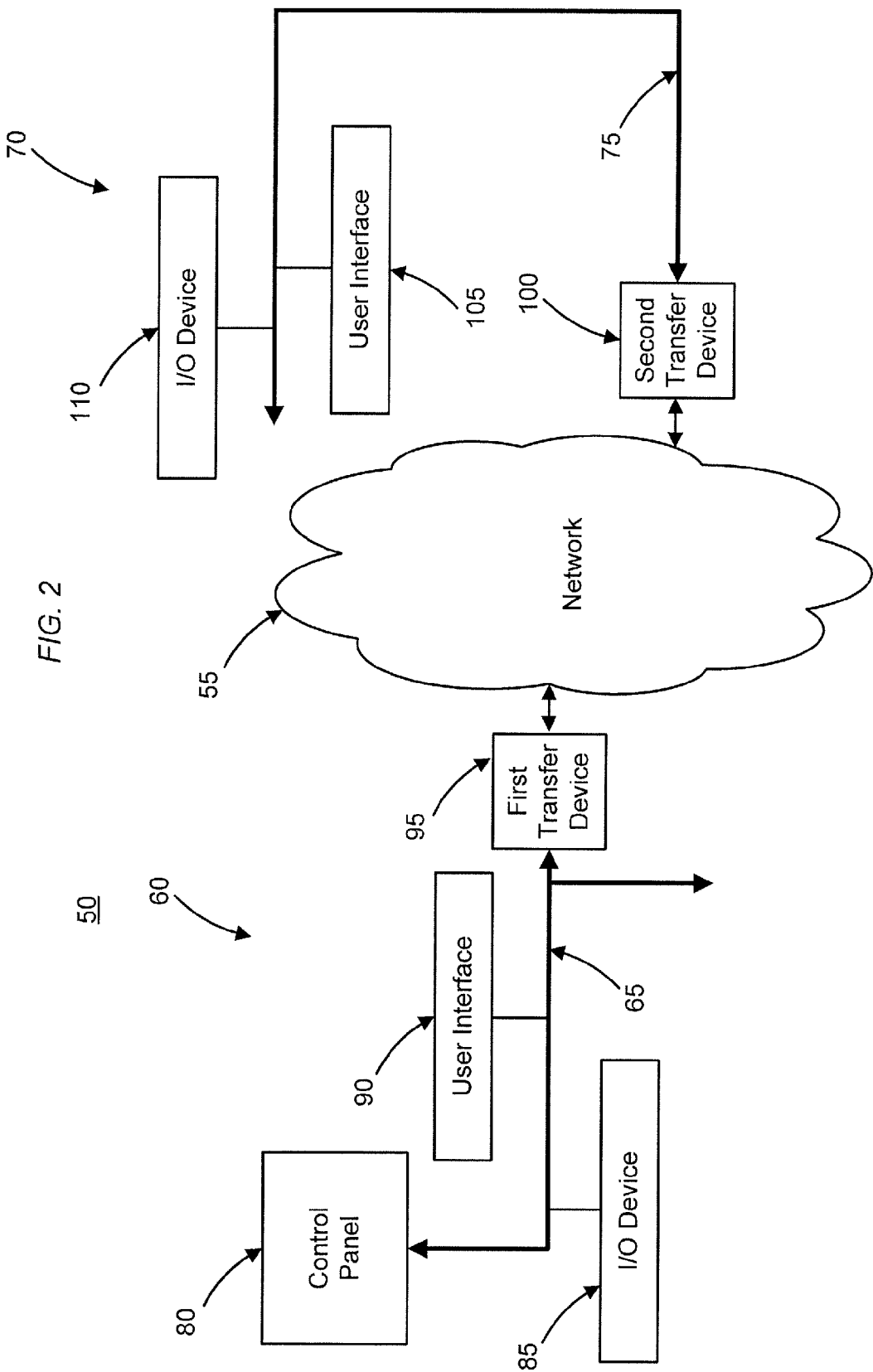
FIG. 2 is a diagram of a security system according to an embodiment of the invention.

FIG. 2 illustrates a security system 50 that uses a combination of dedicated (i.e., only used by the security system 50), hard-wired field busses and a network 55 (e.g., Ethernet) to connect the components and devices within the security system 50. The security system 50 includes a first set of devices 60 that are connected by a first dedicated, hard-wired field bus 65 and a second set of devices 70 that are connected by a second dedicated, hard-wired field bus 75. The first and second sets of devices 60 and 70 are discrete and separated from one another. For example, the first set of devices 60 is located on a building's first floor and the second set of devices 70 is located on the building's fourth floor. The first set of devices 60 includes a security or control panel 80, a first I/O device 85, a first user interface 90, and a first transfer device 95. Each of the first set of devices 60 receives power from the control panel 80 which is connected to mains power. In some embodiments, the control panel 80 also includes an integrated power supply and/or memory for storing executable instructions, data, and messages. The second set of devices 70 includes a second transfer device 100, a second user interface 105, and a second I/O device 110. Each device in the second set of devices 70 receives power from at least one of the second transfer device 100, the second user interface 105, the second I/O device 110, or a different device, at least one of which is coupled to mains power. The control panel, the I/O devices, and the user interfaces function in substantially the same manner as the security system of FIG. 1.

The first transfer device 95 is coupled directly to the first field bus 65 and is configured to convert information from the control panel 80 from a first form to a second form. For example, information is sent through the first field bus 65 using a proprietary security system transmission protocol. The first transfer device 95 receives the information sent using the proprietary protocol and packetizes the information in compliance with network protocol requirements for transmission through the network 55. The first transfer device 95 then sends the packetized information through the network 55 to one or more destination devices. The destination devices are, for example, the second transfer device 100, the second user interface 105, or the second I/O device 110. The second transfer device 100 receives the packetized information from the first transfer device 95 and depacketizes the packetized information such that the information is once again in the proprietary security system protocol. The second transfer device 100 compares the destination address of the information to its own device address. If the destination address is different than the second transfer device 100's device address, the second transfer device 100 sends the information out on the second field bus 75. Information from one of the second set of devices 70 is sent back to the control panel 80 in a similar manner. In some embodiments, the first transfer device 95 can be incorporated into the control panel 80 and is not directly coupled to the first field bus 65. Additionally or alternatively, the second transfer device 100 can be incorporated into another of the second set of devices 70.

As described above, the transfer devices are configured to convert or packetize information (e.g., messages and data) from the control panel or a peripheral device in order to send the messages and data through the network 55. The transfer devices function across protocols and are capable of converting or packetizing any of a number of different security system protocols into compliance with a network protocol. Additionally or alternatively, the transfer devices are configured to be compatible with a plurality of different network protocols such as Ethernet, Token Ring, Asynchronous Transfer Mode (ATM), and the like. In some embodiments, the transfer devices can be configured to switch between the network types using software or using hardware such as a physical switch.

Figure 3:
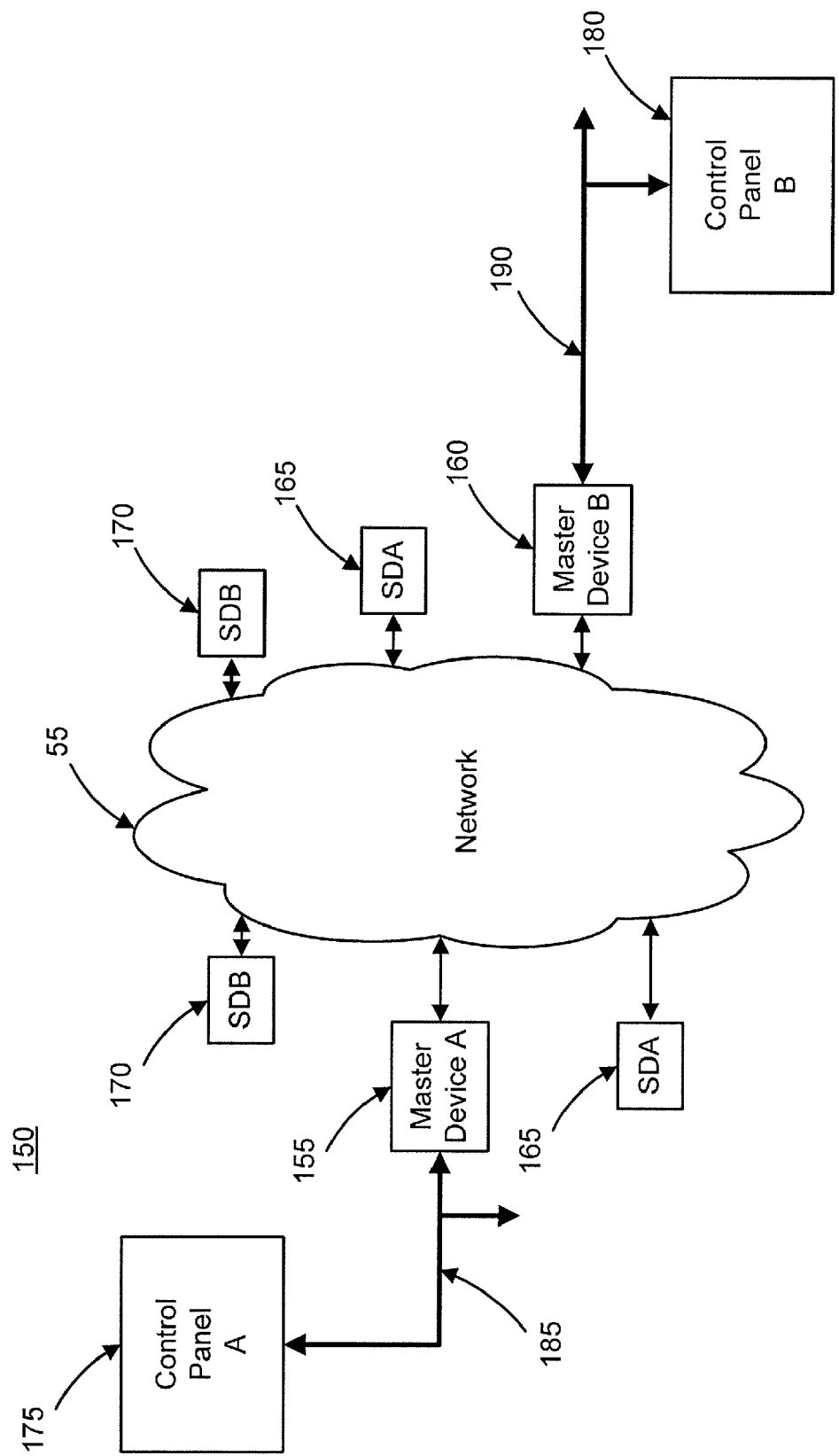
FIG. 3 is a diagram of a security system according to another embodiment of the invention.

FIG. 3 illustrates a security system that includes a master device A 155, a master device B 160, a set of slave devices A 165, a set of slave devices B 170, a control panel A 175, and a control panel B 180. Each master device and set of associated slave devices is designated using a group code such as a letter or a number (e.g., A, B, 1, 2, etc.). The group code for each transfer device is set during installation or configuration of the security system 150, as described below. In other embodiments, different types of group codes can be used.

A first field bus 185 and a second field bus 190 connect control panel A 175 to master device A 155 and control panel B 180 to master device B 160, respectively. The slave devices A 165 are connected through the network 55 to master device A 155. Slave devices B 170 are connected through the network 55 to master device B 160. As described above, master device A 155 and master device B 160 can alternatively be incorporated into control panel A 175 and control panel B 180, respectively. In other embodiments, additional control panels, master devices, and slave devices are included in the security system.

Figure 4:
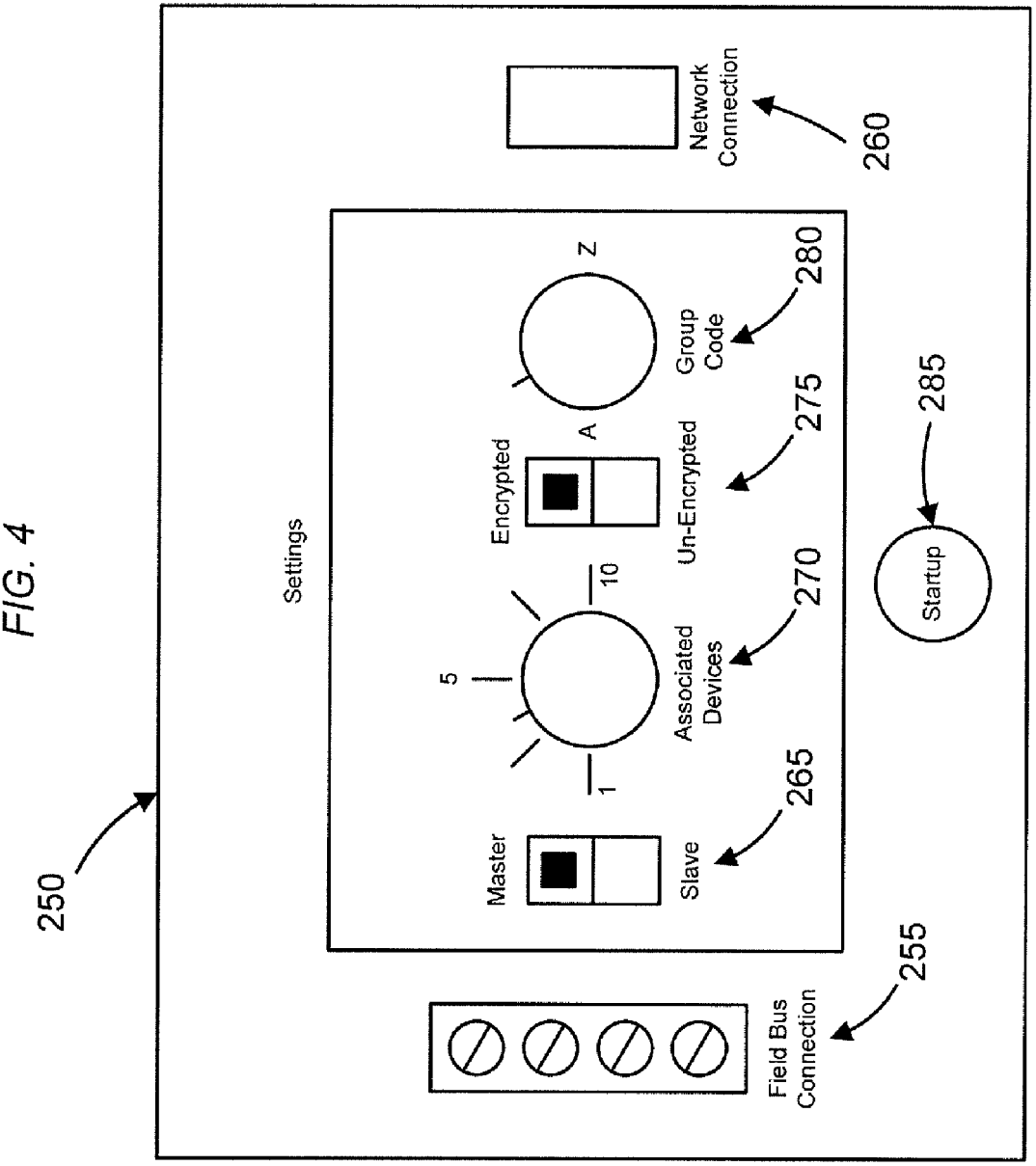
FIG. 4 is a diagram of a transfer device according to an embodiment of the invention.

A transfer device 250 for coupling a dedicated, hard-wired field bus to a network is illustrated in FIG. 4. The transfer device 250 includes a plurality of field bus connection terminals 255 for connecting to the dedicated, hard-wired field bus and a network connection terminal 260 for connecting to the network. The transfer device 250 also includes a master/slave switch 265, an associated slave devices knob 270, an encryption switch 275, a group code knob 280, and a startup button 285. The master/slave switch 265 allows the transfer device 250 to be configured as either a master device or a slave device. A master device is a transfer device that is either connected directly to a control panel or a transfer device that is coupled to the same dedicated, hard-wired field bus as a control panel. If the transfer device 250 is configured as a master device, the associated slave devices knob 270 is adjusted to indicate the number of slave devices associated with the master device. The encryption switch 275 allows each transfer device 250 to send and receive encrypted information through a network. The encryption switch 275 allows the transfer device 250 to encrypt security system information using a variety of encryption standards including the Data Encryption Standard (DES), the Advanced Encryption Standard (AES), or the like. In some embodiments, the master and slave devices are different from one another. For example, a slave device can include additional hardware such as an integrated power supply or a display. FIG. 4 illustrates one example of the transfer device 250. In other embodiments, the functionality of the transfer device 250 can be implemented in software and be accessed and configured using, for example, a web browser or a program such as HyperTerminal.

Figure 5:
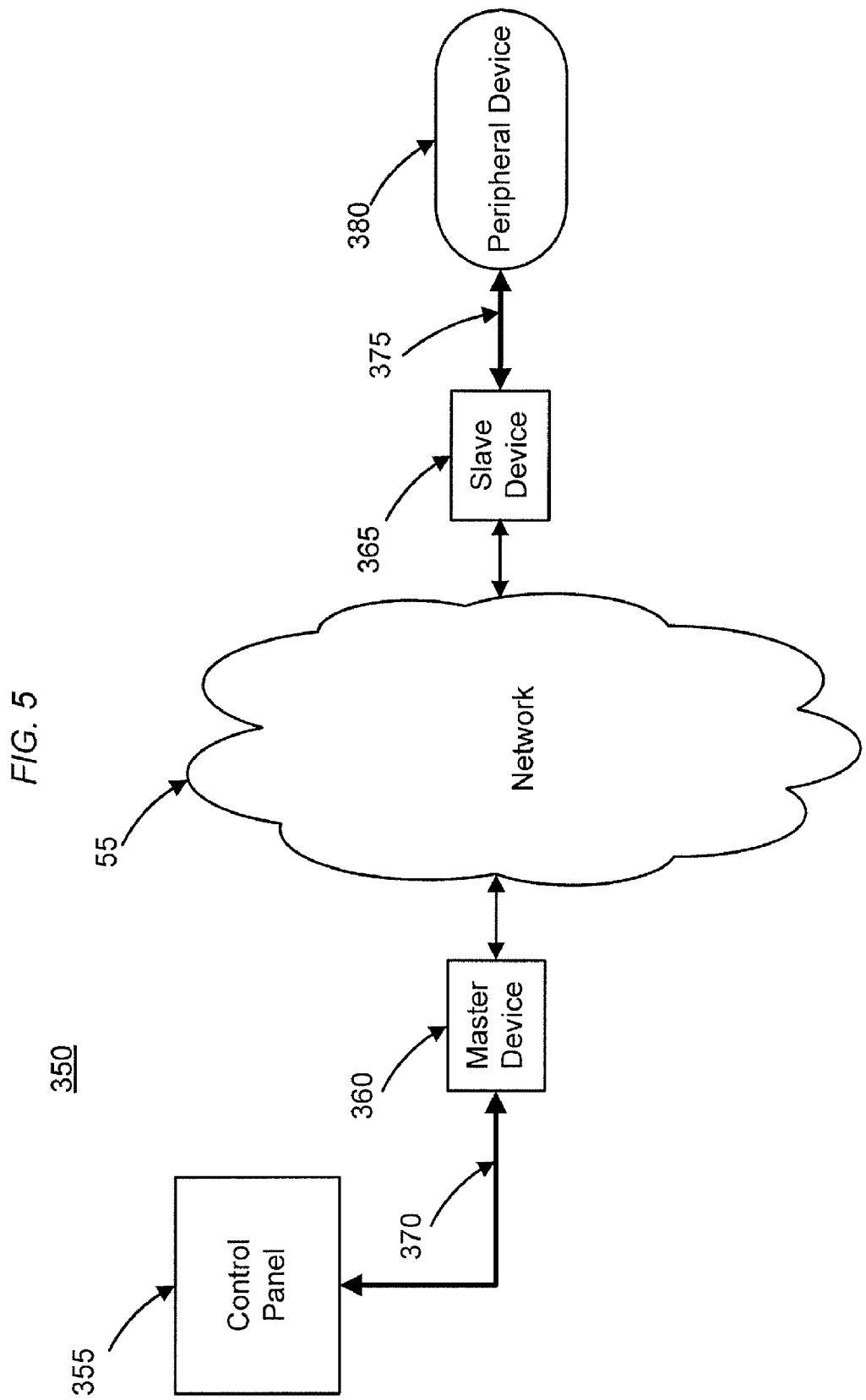
FIG. 5 is a diagram of a security system according to an embodiment of the invention.
Figure 6:
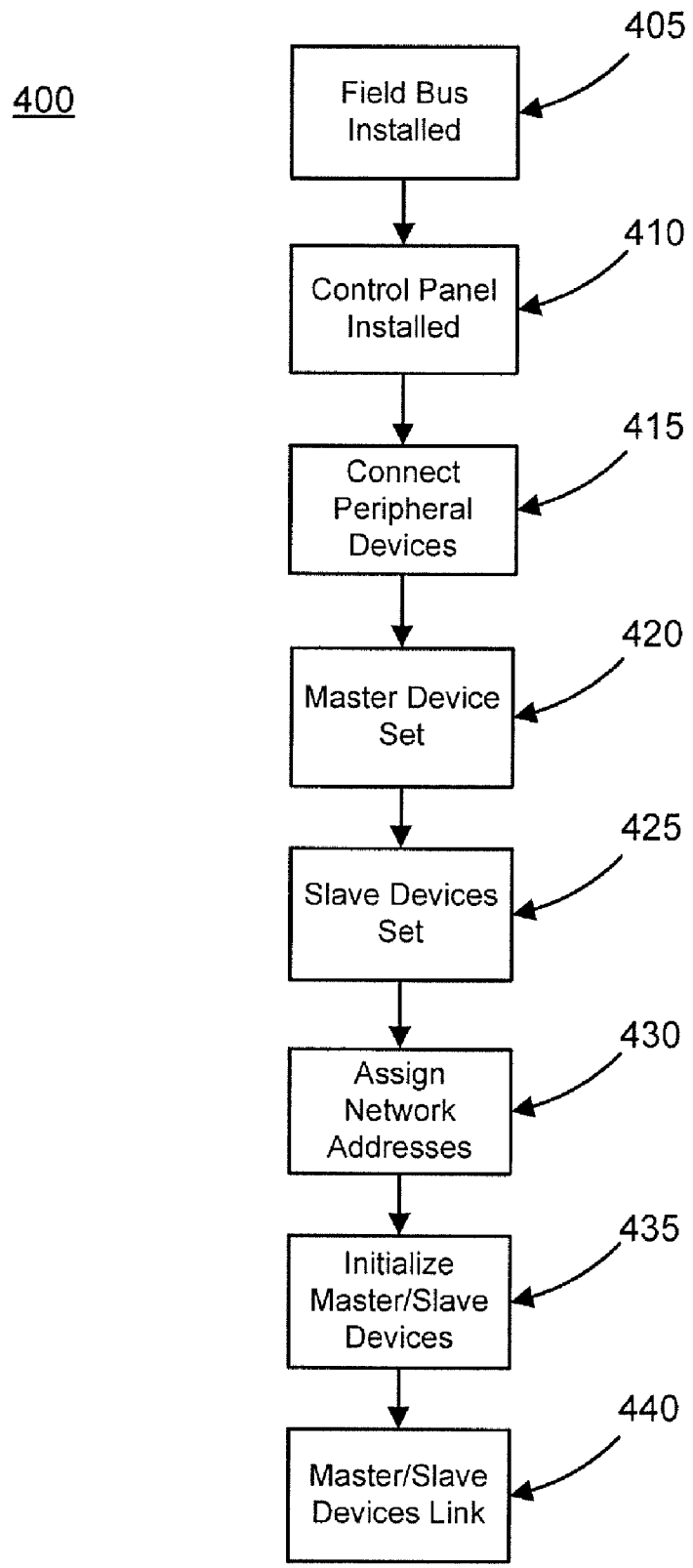
FIG. 6 illustrates a process for connecting the security system of FIG. 5.

FIG. 5 illustrates a security system 350 that includes a control panel 355, a master device 360, a slave device 365, a first dedicated, hard-wired field bus 370, a second dedicated, hard-wired field bus 375, and a peripheral device 380. The peripheral device 380 is, for example, an alarm, a display, a keyboard, or the like. FIG. 6 illustrates a process for connecting the security system 350 of FIG. 5 using the network 55. The first dedicated, hard-wired field bus 370 is installed in a first part of, for example, a commercial building and the second dedicated, hard-wired field bus 375 is installed in a second part of the commercial building that is discrete and separated from the first part of the commercial building (step 405). The control panel 355 is coupled to the first field bus (step 410), and the peripheral device 380 is coupled to the second field bus 375 (step 415).

As described above, a transfer device can be configured as either a master device or a slave device. At least one transfer device is configured as the master device 360 (step 420) and at least one transfer device is configured as the slave device 365 (step 425). The master device 360 is connected to the control panel 355. As described above, the master device 360 can either be coupled to the same dedicated, hard-wired field bus as the control panel 355 or is incorporated into the control panel 355. If incorporated into the control panel 355, the master device 360 is not required to be directly coupled to the first field bus 370.

The network 55 assigns a network address to each of the master and slave devices coupled to the network (step 430). After step 430, the master and slave devices 360 and 365 are initialized (step 435) by, for example, activating the startup button 285 illustrated in FIG. 4. In other embodiments of the invention, the master and slave devices 360 and 365 are initialized in software using a web browser or a program such as HyperTerminal. Once initialized, the master device 360 links with a corresponding slave device 365 (step 440), as described below. Following step 440, the security system 350 is ready to transfer data and messages from the control panel to the peripheral devices.

Figure 7:
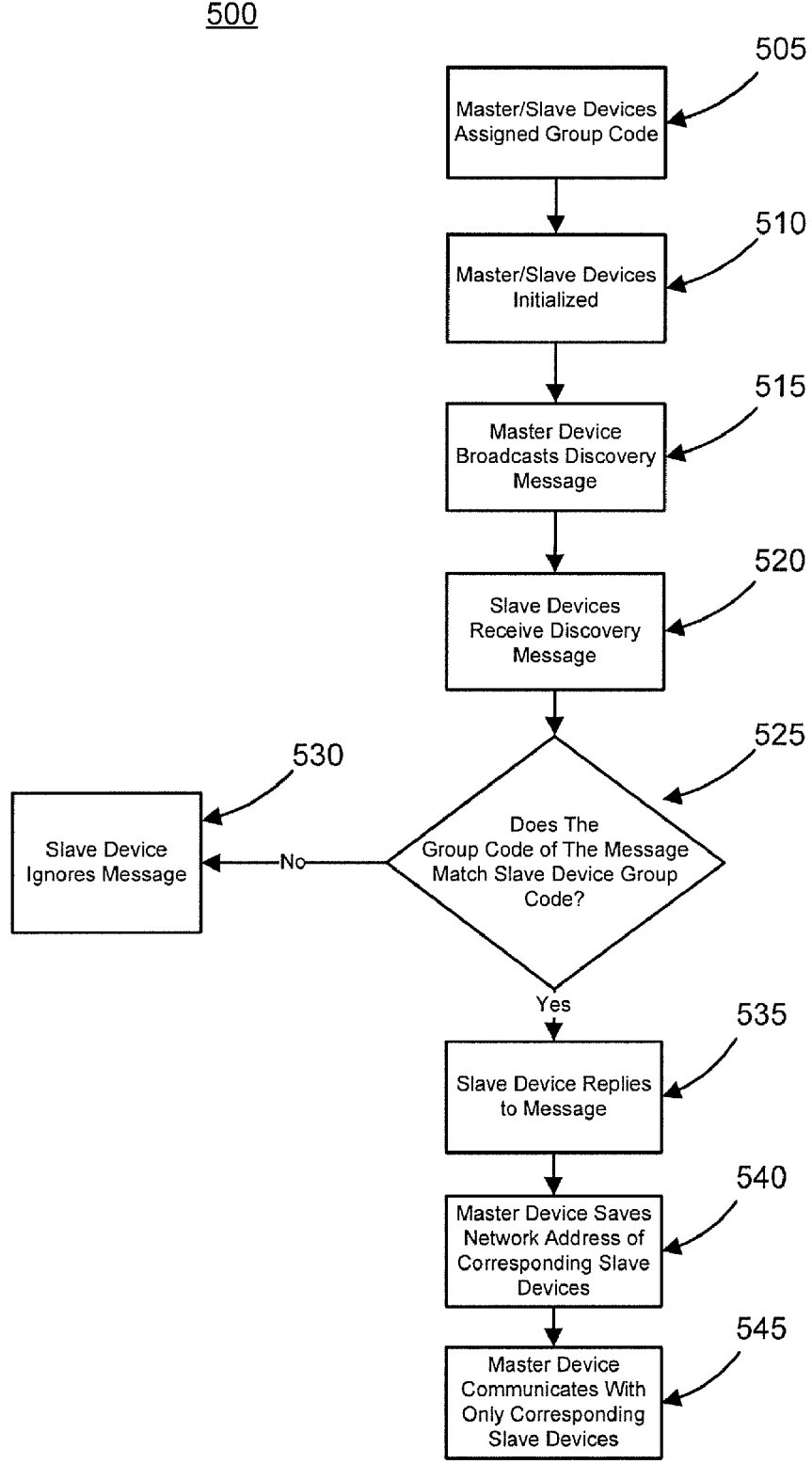
FIG. 7 illustrates a process for linking two transfer devices through a network.

FIG. 7 illustrates a process 500 for linking transfer devices using group codes. Each master device and each slave device is assigned a group code (step 505) during installation or reconfiguration of the security system. A master device and each of the slave devices associated with the master device are assigned the same group code. The master and slave devices are initialized (step 510). The master device broadcasts a discovery message (step 515) indicating that it is searching for slave devices with the same group code setting. Each slave device coupled to the network receives the discovery message (step 520). Each of the slave devices determines whether the group code for the discovery message matches its own group code (step 525). If the slave device's group code does not match the master device's group code, the slave device ignores the discovery message (step 530). If the slave device's group code matches the master devices group code, the slave device replies to the discovery message (step 535). The master device receives the reply messages and saves network addresses for the corresponding slave devices to a memory (step 540). The master device then communicates with only the corresponding slave devices when sending information through the network (step 545). In other embodiments of the invention, the master device polls the slave devices to acquire the IP addresses of the slave devices with a corresponding group code.

The security system 350 illustrated in FIG. 5 is configured for two-way communication such that information (e.g., data, messages, etc.) is sent from the control panel 355 to the peripheral device 380 and vice versa. Messages generated by the control panel 355 include, for example, requests for the status of the peripheral device 380 or a request for the peripheral device 380 to execute an action. Messages generated by the peripheral device 380 include, for example, message receipt confirmations, status messages, or acknowledgements of actions that the peripheral device executed.

Figure 8:
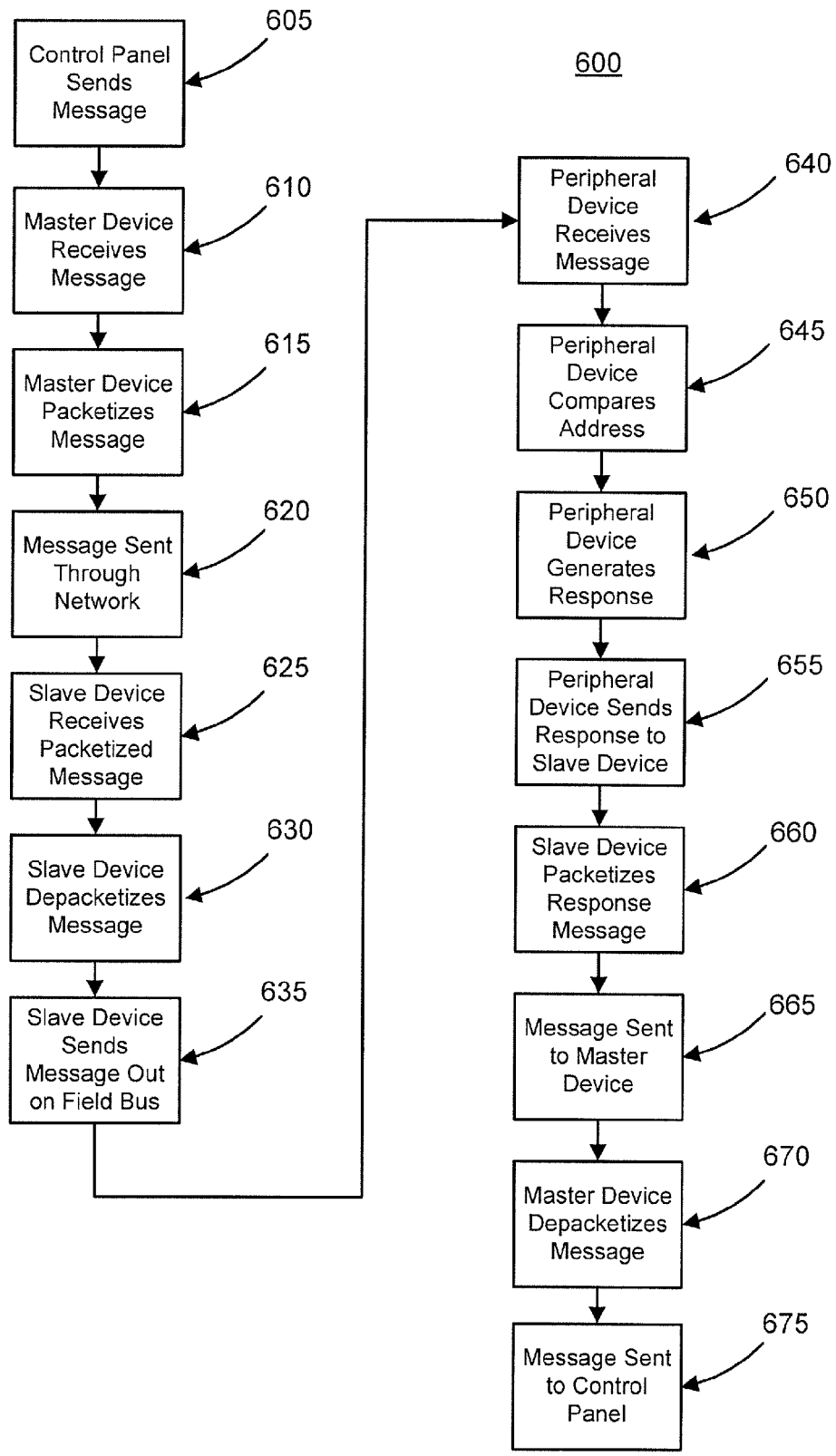
FIG. 8 illustrates a direct-polling process for transmitting data through the security system of FIG. 5.

A plurality of methods can be used to transmit messages and data through the security system 350. One example, a direct-polling process 600 for transmitting information between the control panel 355 and the peripheral device 380, is illustrated in FIG. 8. The control panel is pre-programmed with information related to each of the devices connected to the security system. The process 600 begins when the control panel 355 sends a message or data out on the first field bus 370 (step 605). The master device 360 receives the message (step 610) from the control panel 355. Following step 610, the master device 360 packetizes the message (step 615) and sends the packetized message through the network (step 620). The slave device 365 receives the packetized message from the master device 360 (step 625) and depacketizes the packetized message (step 630). If the destination address for the message does not match the slave device 365's device address, the slave device 365 sends the message out on the second field bus 375 (step 635). The peripheral device 380 receives the message (step 640) from the slave device 365. The peripheral device 380 compares its device address to the message's destination address (step 645). If the peripheral device 380's device address matches the destination address for the message, the peripheral device 380 generates an acknowledgement message to confirm receipt of the message (step 650). The message generated by the peripheral device 380 is sent back to the slave device 365 on the second field bus 375 (step 655). The slave device 365 packetizes the message (step 660) and sends the packetized message through the network 55 to the master device 360 (step 665). The master device 360 depacketizes the packetized message (step 670) and sends the message to the control panel 355 (step 675) on the first field bus 370.

Additionally or alternatively, the peripheral device 380 generates an acknowledgement for executed actions. For example, a peripheral device, such as a display, may receive a message from a control panel indicating that a particular message is to be displayed. After the display displays the requested message, an acknowledgement is generated and sent to the control panel to indicate that the display action was executed successfully. In another embodiment, the control panel sends a message to a peripheral device such as an alarm to indicate that the alarm is to be activated in a particular way or for a specified duration. If the alarm is a horn or a siren, the alarm generates an acknowledgement when, for example, it has begun sounding and/or has finished sounding.

Figure 9:
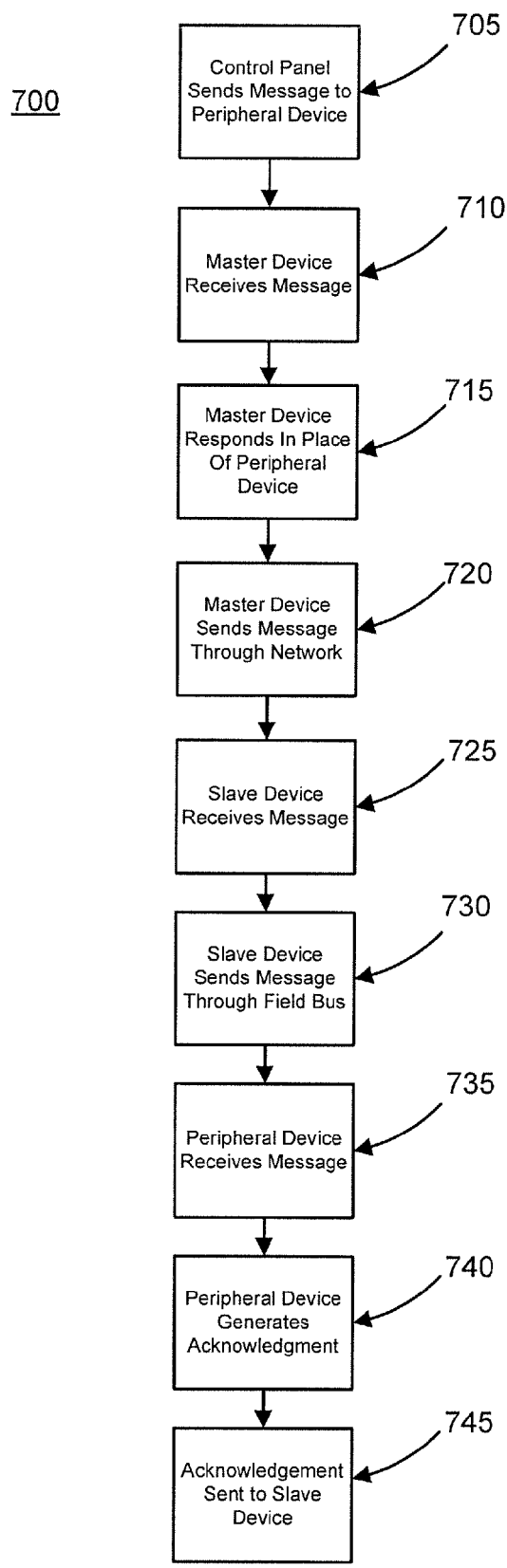
FIG. 9 illustrates a store-and-forward process for transmitting data through the security system of FIG. 5.

FIG. 9 illustrates a store-and-forward process 700 for transmitting information between the control panel 355 and the peripheral device 380 of FIG. 5. The store-and-forward process 700 is more complex than the direct-polling process 600 of FIG. 8. The process 700 requires the control panel 355 and the master and slave devices 360 and 365 in the security system 350 to have a comprehensive knowledge of the security system 350's protocol, the devices within the security system 350, and the structure of the security system 350. For example, the process 700 requires that each of the slave devices know which peripheral devices it is attached to and the messages necessary to control the peripheral devices. Additionally, the master device 360 must know of all the peripheral devices connected to all of its corresponding slave devices. In some embodiments, the master and slave devices 360 and 365 are capable of learning the security system protocol and devices attached to it based on the data and messages that are sent through the network.

In the store-and-forward process 700, the master device 360 emulates the peripheral device by replying to messages from the control panel 355 as if the master device 360 were the intended peripheral device 380. Similarly, the slave device 365 emulates the control panel by responding to messages from the peripheral device 380 as if it were the control panel 355. For example, the control panel 355 sends a message or data that is intended for a peripheral device 380 (step 705). The master device 360 receives the message on the first field bus 370 (step 710). Unlike the direct-polling process 600, before the master device 360 packetizes and sends the message through the network 55 to the slave device 365, the master device 360 responds with an acknowledgement message to the control panel 355 in place of the peripheral device 380 (step 715). The master device 360 then packetizes the message and sends the packetized message through the network 55 to the slave device 365 (step 720). The slave device 365 receives the packetized message (step 725), depacketizes the packetized message, and sends the message out on the second field bus 375 (step 730). The peripheral device 380 receives the message (step 735) and generates a receipt acknowledgment message (step 740). The acknowledge message is sent out on the second field bus 375 to the slave device 365 (step 745). The slave device 365 receives the acknowledge message but does not send the message through the network 55.

The store-and-forward method of communicating in a security system is advantageous when the security system is subject to timeout conditions. For example, a control panel sends a message out on a first field bus. The message is intended for a peripheral device that is in a discrete and separate part of the security system. The message is transmitted through the security system as described above. The control panel expects to hear a response or an acknowledgement from the peripheral device within a predetermined period of time (e.g., a timeout delay). The timeout delay for which the control panel is configured to wait is selected based on the implementation of the security system. In some embodiments, the timeout delay is programmable. If the security system does not receive a response before the timeout delay expires, the control resends the message and waits for a response. If the control panel does not receive a response the second time, the security system determines that an error (e.g., a break-in, a malfunction, etc.) has occurred, and an alarm is sounded or a different precautionary action is taken. However, in such a configuration, the security system is susceptible to erroneous alarms if the response time required to receive a message from the peripheral device is longer than the timeout delay. If the security system can be configured with a long timeout delay, the direct-polling method of FIG. 8 is likely sufficient to avoid system errors. However, in an implementation of the security system in which the timeout delay is shorter, the store-and-forward method of communication mitigates errors caused by the security system's communication lag.

In both the direct-polling and the store-and-forward communication methods, the control panel continuously polls or sends messages to the peripheral device (e.g., wait for instructions). As a consequence of the master device responding in place of the peripheral device, the control panel experiences very little delay in receiving responses. Additionally, the slave device continuously polls or provides messages to the peripheral device. If the slave device does not receive a response from the peripheral device, the slave device sends a message through the network to the master device indicating that an error has occurred. The master device then stops responding to the messages from the control panel, which indicates to the control panel that an error has occurred with the peripheral device. In other embodiments, a plurality of other master devices, slave devices, peripheral devices, and control panels are included in the security system.

Thus, the invention provides, among other things, a system and method for connecting discrete parts of a security system using a network. Various features and advantages of the invention are set forth in the following claims.

What is claimed is:

1. A security system connected with a local area network, the security system comprising:
    a first dedicated, hard-wired field bus;
    a control panel sending data through the first field bus;
    a first plurality of peripheral devices coupled to the first field bus;
        wherein each of the first plurality of peripheral devices receives data from the control panel;
    a first transfer device connected to the control panel;
        wherein the first transfer device packetizes the data from the control panel and sends the packetized data through the local area network, and
        wherein the first transfer device generates an acknowledgment message in response to the data from the control panel before the packetized data is sent through the local area network;
    a second dedicated, hard-wired field bus;
    a second transfer device coupled to the second field bus;
        wherein the second transfer device receives the packetized data from the first transfer device and depacketizes the packetized data; and
    a second plurality of peripheral devices coupled to the second field bus;
        wherein each of the second plurality of peripheral devices receives data from the second transfer device, generates a second acknowledgement message in response to the data from the second transfer device, and sends the second acknowledgement message to the second transfer device,
        and wherein the second transfer device does not send the second acknowledgment message to the control panel.

2. The security system of claim 1, wherein the first transfer device is further configured to send the acknowledgment message to the control panel.

3. The security system of claim 1, wherein the first transfer device is incorporated into the control panel.

4. The security system of claim 1, wherein the second transfer device is incorporated into one of the second plurality of peripheral devices.

5. The security system of claim 1, wherein the first and second transfer devices are configured using a browser.

6. The security system of claim 1, wherein the first transfer device is coupled to the first field bus.

7. The security system of claim 1, wherein the first transfer device is a master device and the second transfer device is a slave device.

8. The security system of claim 7, wherein the slave device includes knowledge of each of the second plurality of peripheral devices attached to the second field bus.

9. The security system of claim 8, wherein the master device includes knowledge of each of the second plurality of peripheral devices connected to each of a plurality of slave devices.

10. A method for connecting a security system using a local area network, the method comprising:
    coupling a first plurality of peripheral devices to a first dedicated, hard-wired field bus;
    sending data from a control panel through the first field bus;
    receiving the data from the control panel at each of the first plurality of peripheral devices;
    connecting a first transfer device to the control panel;
    converting the data from a first form to a second form using the first transfer device;
    sending the converted data through the local area network;

generating an acknowledgment message in response to the data before the converted data is sent through the local area network;
coupling a second transfer device to a second dedicated, hard-wired field bus;
coupling a second plurality of peripheral devices to the second field bus;
receiving, at the second transfer device, the converted data from the first transfer device;
converting the converted data from the second form to the first form using the second transfer device;
receiving the data from the second transfer device at each of the second plurality of peripheral devices;
generating a second acknowledgement message in response to the data from the second transfer device using each of the second plurality of peripheral devices;
sending the second acknowledgement message to the second transfer device; and
emulating the control panel using the second transfer device.

11. The method of claim 10, further comprising sending the acknowledgment message to the control panel.

12. The method of claim 10, further comprising incorporating the first transfer device into the control panel.

13. The method of claim 10, further comprising incorporating the second transfer device into one of the second plurality of peripheral devices.

14. The method of claim 10, further comprising configuring the first and second transfer devices using a browser.

15. The method of claim 10, further comprising coupling the first transfer device to the first field bus.

16. The method of claim 10, further comprising configuring the first transfer device as a master device and the second transfer device as a slave device.

17. The method of claim 10, wherein converting the data from the first form to the second form includes packetizing the data.

18. The method of claim 10, wherein converting the data from the second form to the first form includes depacketizing the data.

* * * * *